United States Patent [19]
Hayakawa

[11] Patent Number: 5,907,729
[45] Date of Patent: May 25, 1999

[54] CAMERA HAVING COVER MECHANISM OF FILM CHAMBER

[75] Inventor: Masahiro Hayakawa, Kanagawa-ken, Japan

[73] Assignee: Asahi Kogaku Kogyo Kabushiki Kaisha, Tokyo, Japan

[21] Appl. No.: 09/019,699

[22] Filed: Feb. 6, 1998

[30] Foreign Application Priority Data

Feb. 7, 1997 [JP] Japan ................................. 9-025022

[51] Int. Cl.$^6$ ................................................ G03B 17/24
[52] U.S. Cl. ................................. 396/411; 396/536
[58] Field of Search ............................. 396/536, 538, 396/387, 411, 418

[56] References Cited

U.S. PATENT DOCUMENTS 4,240,734  12/1980  Nomura et al. .
4,374,614   2/1983  Kobayashi .
4,888,114  12/1989  Yamamoto et al. .
5,587,757  12/1996  Seamans et al. .................. 396/536
5,625,432   4/1997  Omi ................................... 396/538
5,715,495   2/1998  Nishimura ......................... 396/538
5,717,971   2/1998  Stiehler et al. .................... 396/538
5,727,244   3/1998  Kitazawa .

*Primary Examiner*—David M. Gray
*Attorney, Agent, or Firm*—Greenblum & Bernstein P.L.C.

[57] ABSTRACT

A camera includes a cover for opening and closing a film chamber, and a lock mechanism that is operable in a first and second modes in the first mode, the lock mechanism inhibits the cover from opening. In the second mode, the lock mechanism allows the cover to open. The first mode starts when the film spool is rotated in a winding direction and continues until the film spool is rotated in a rewinding direction. The second mode starts when the film spool is rotated in the rewinding direction continued until the film spool is rotated in the winding direction.

23 Claims, 11 Drawing Sheets

CAMERA HAVING COVER MECHANISM OF FILM CHAMBER

BACKGROUND OF THE INVENTION

A camera has a film chamber for accommodating a film patrone therein. In general, film chamber opens at the bottom of a camera body. A cover is provided to the bottom of the camera body for closing the opening. The cover is swingable so that the cover can be opened and closed. In order to lock the cover in a closed position, the cover and the camera body respectively have hook members which engage with each other when the cover is closed. An operation lever is provided to release the engagement of the hook members, which is used to open the cover. On opening the cover, a user must operate the operation lever.

If a user unintentionally touches the operation lever, causing the cover to open, an unused film fed out of the film patrone may be exposed to the external light. Thus, the conventional camera is further provided with a lock button which locks the operation lever. On opening the cover, the user must operate the operation lever while pressing the lock button at the same time. With this, the operation for opening the cover is complicated.

SUMMARY OF THE INVENTION

It is therefore an object of the present invention to provide a camera having a cover mechanism of a film chamber in which a cover can be easily opened and it is prevented that the cover is unintentionally opened.

According to one aspect of the present invention, there is provided a camera includes a camera body, a spool holder for supporting a film spool accommodated in a film chamber so that the film spool is rotatable in winding and rewinding directions, a cover provided to the camera body for opening and closing the film chamber, and a lock mechanism that is operable in first and second modes. In the first mode, the lock mechanism inhibits the cover from opening. In the second mode, the lock mechanism allows the cover to open. The first mode starts when the film spool is rotated in the winding direction and continues until the film spool is rotated in the rewinding direction. The second mods starts when the film spool is rotated in the rewinding direction and continues until the film spool is rotated in the winding direction.

As constructed above, once the film spool is rotated in the winding direction, the cover can not be opened until the film spool is rotated in the rewinding direction. That is, the cover can not be opened until the film is used up (and a film rewinding is performed). Thus, it is prevented, that the unused film is unintentionally exposed. Further, since it is not necessary to manually operate the lock mechanism, the operation of the camera is easy.

In a preferred embodiment, the spool holder includes drive and driven forks provided to the film chamber, which support the film spool therebetween. The lock mechanism is actuated in response to the rotation of the driven fork. With such an arrangement, the lock mechanism can be linked to a film-winding mechanism of the camera in a simple manner.

In a particular arrangement, the camera further includes a latch mechanism which latches the cover, an operation member that is operated to release the latch mechanism thereby to open the cover. The lock mechanism is arranged to lock the cover even when the operation member is operated to release the latch mechanism.

In this case, the lock mechanism includes an engaging member movably provided to the cover. The engaging member engages a chamber wall of the film chamber when the lock mechanism is in the first mode. In particular, the lock mechanism includes a cam ring which moves the engaging member, a transmission disk which transmits the rotation of the spool to the cam ring, and restriction members which restrict the rotating angle of the cam disk. When the lock mechanism is in the first mode, the cam ring reaches one end of its rotating angle. When the lock mechanism is in the second mode, the cam ring reaches another end of its rotating angle. When the cam ring is stopped and the film spool is rotated, the cam ring and the transmission disk slide with respect to each other to allows the rotation of the spool. It is preferable that the transmission disk is filled to the driven fork.

It is preferred to provide an arrangement that maintains the lock mechanism in the second mode, when the cover is opened. In particular, the arrangement including a stopper provided to the cover. When the cover is closed, the stopper is urged by a chamber wall of the film chamber so that the stopper is retracted from a position in which the stopper stops the cam ring.

In another particular arrangement, the lock mechanism is arranged to disable the operation member when the look mechanism is the first mode. In this case, the lock mechanism includes an engaging member movably provided to the cover. When the lock mechanism is in the first mode, the engaging member interferes the operation member so as to disable the operation member.

DESCRIPTION OF THE PREFERRED EMBODIMENT

The present invention is described with reference to the preferred embodiments thereof.

Figure 1:
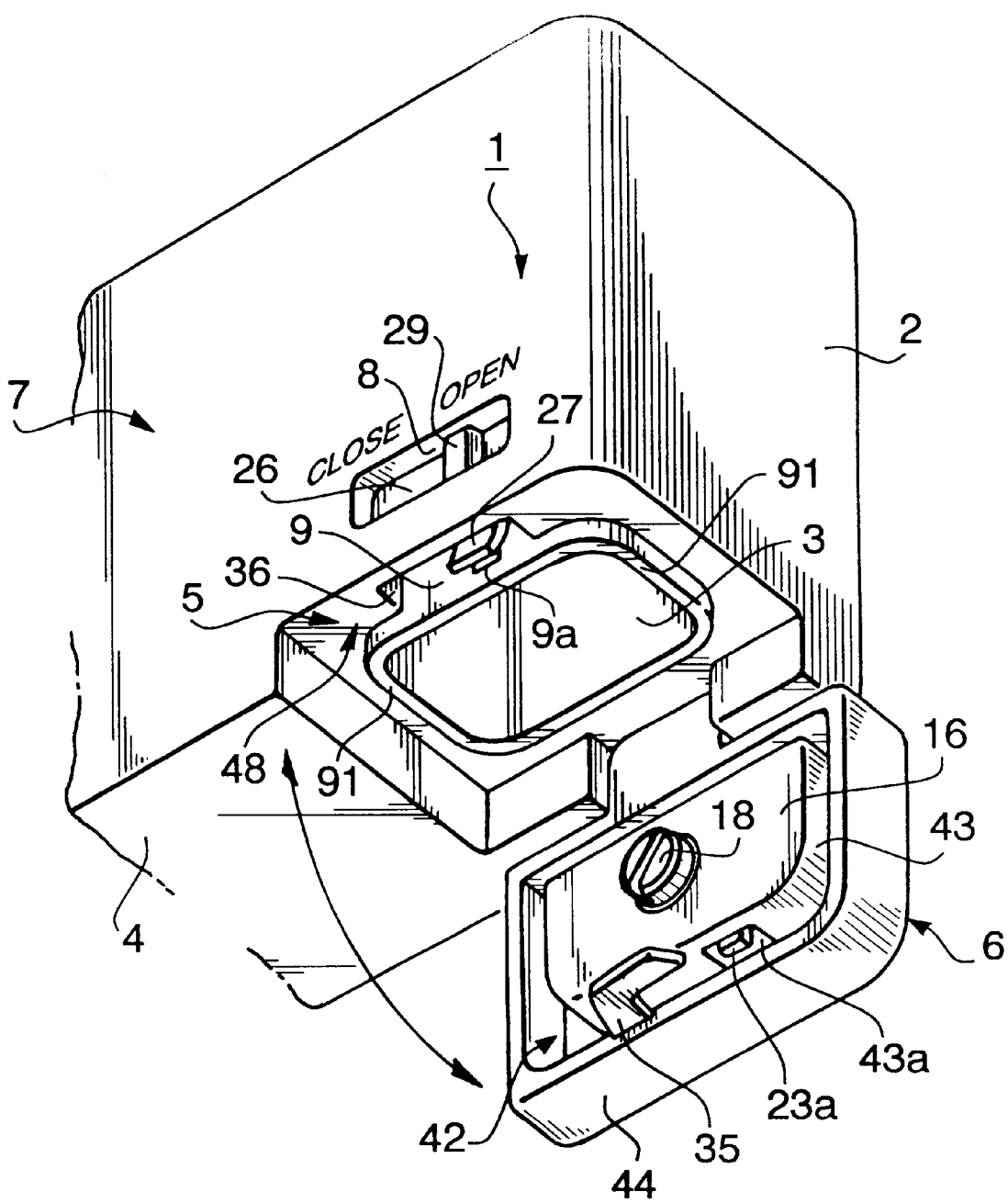
FIG. 1 is a bottom perspective view of a camera of the first embodiment.

The first embodiment is described. FIG. 1 is a bottom perspective view of a camera body 1. A film chamber 3 is provided at a lateral side portion of the camera body 1, for accommodating a film patrone 19 (FIG. 2) there in. A step portion 5 is formed on the bottom of the lateral side portion of the camera body 1. The film chamber 3 opens at the bottom surface of the step portion 5. A cover 6 is pivotably provided to the bottom of the camera body 1 to close the opening of the film chamber 3. The cover 6 fits the step portion 5 when the cover 6 is closed.

Figure 2:
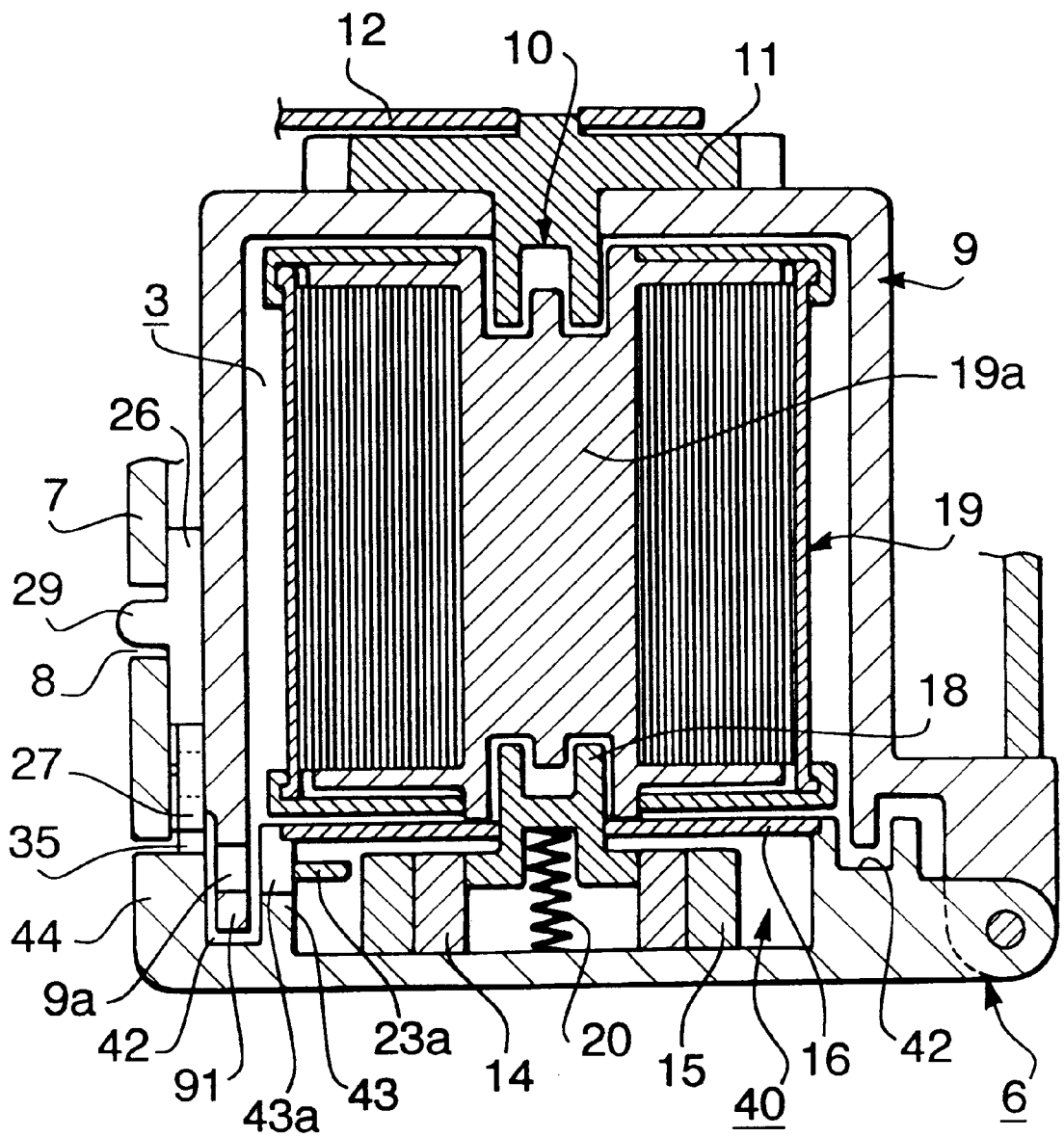
FIG. 2 is a sectional view of a film chamber and a cover of the camera of FIG. 1.

FIG. 2 is a sectional view of the film chamber 3 and the cover 6. The film chamber 3 includes a chamber wall 9 which constitutes an box-shaped structural body. A drive fork 10 and a driven fork 18 are provided to support a film spool 19a in the film patrone 19 accommodated in the film chamber 3. The drive fork 10 is provided on the top of the chamber wall 9, while the driven fork 18 is provided to the cover 6 as described below. The drive fork 10 penetrates the top plate of the chamber wall 9 and engages the top of the film spool 19a. The drive fork 10 is unitarily formed with a gear 11 which is driven by a film winding motor (not shown) via a gear train (not shown). The gear 11 (as well as the drive fork 10) is held by a plate member 12 provided above the chamber wall 9. The drive fork 10 is rotated in a winding direction and rewinding direction. The film spool 19a is rotated by the rotation of the live fork 10.

The cover 6 has a recess 40 formed at a center portion thereof for accommodating a lock mechanism described below. A groove 42 is formed around the recess 40 of the cover 6. As shown in FIG. 1, the groove 42 is so formed that a lower end 91 of the chamber wall 9 fits into the groove 42. An outer wall 44 is defined between the groove 42 and the periphery of the cover 6. As shown in FIG. 2, in inner wall 43 is defined between the recess 40 and the groove 42. The recess 40 is covered by a top plate 16 placed on the inner walls 43.

Figure 3A:
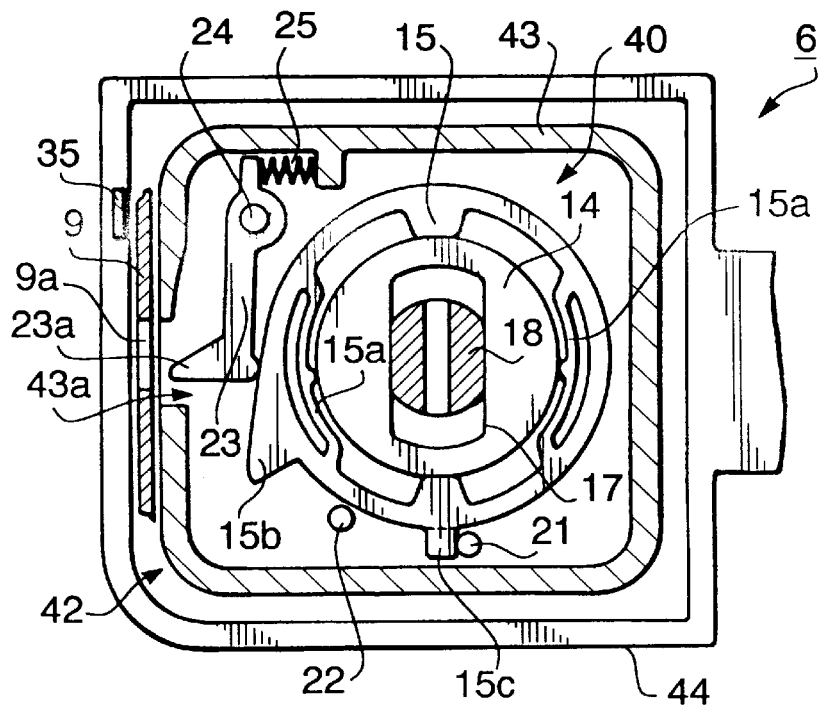
FIGS. 3A and 3B are plan views of a cover of the first embodiment respectively when cover is unlocked and the cover is locked.
Figure 3B:
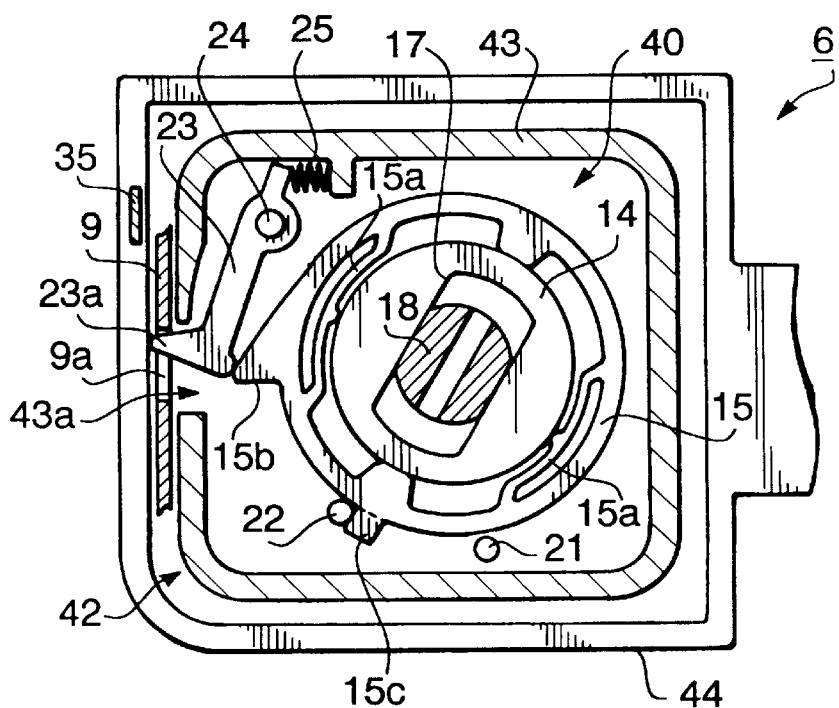

FIGS. 3A and 3B are plan views of the cover 6 (with top plate 16 removed). A transmission disk 14 and a cam ring 15 are provided in the recess 40. The transmission disk 14 has a barrel-shaped center hole 17 in which the drive fork 18 is supported. The driven fork 18 is vertically slidable and rotatably fixed in the center hole 17. As shown in FIG. 2, the driven fork 18 is urged upward by a spring 20 provided beneath the fork 18, so that the fork 18 engages the bottom of the film spool 19. As shown in FIGS. 3A and 3B, the cam ring 15 is provided around the transmission disk 14. The cam ring 15 has a unitarily formed slide contact portion 15a at the inner sides thereof, which slidably contacts the periphery of the transmission disk 14 while urging the periphery of the transmission disk 14. The cam disk 15 is further provided with a cam portion 15b having a straight cam surface which tangentially extends from the periphery of the cam ring 15. In order to limit the rotational angle of the cam ring 15, first and second pins 21 and 22 are provided along the periphery of the cam disk 15. An abutting member 15c is projected from the periphery of the ring 15, which abuts the first pin 21 or the second pin 22.

A swing arm 23 is provided in the recess 40. The swing arm 23 is swingable (about an axis 24) toward and away from the periphery of the cam ring 15. The swing arm 23 has an claw 23a formed at the tip thereof. The swing arm 23 is urged by a compression spring 25 in the direction in which the swing lever 23 is swung toward the cam ring 15. A through-hole 43a is formed on the inner wall 43, which is faced with the claw 23a. When the swing arm 23 is swung away from the cam ring 15, the claw 23a penetrates the through-hole 43a and protrudes outward. Outside the through-hole 43a, an engaging hole 9a is provided to the chamber wall 9. When the swing lever 23 is swung outward as shown in FIG. 3B, the claw 23a is inserted into the engaging hole 9a. The cover 6 can not be opened, due to this engagement of the claw 23a and the engaging hole 9a.

When the drive fork 10 (FIG. 2) rotates in a winding direction (in a direction where the film is fad out of the film spool 19a), the driven fork 18 and the transmission disk 14 are rotated clockwise in FIG. 3B. Then, the cam ring 15 is also rotated clockwise due to a traction caused by the contact between the slide contact portion 15a and the transmission disk 14. By the rotation of the cam ring 15, the cam portion 15b moves into engagement with the swing arm 23, urging the swing arm 23 outward. Since the swing arm 23 is swung outward, the claw 23a penetrates the through-hole 43a and is inserted in the engaging hole 9a. The rotation of the cam ring 15 is stopped when the abutting member 15c abuts the first pin 21. Since the slide contact portion 15a and the transmission disk 14 are slidable with respect to each other, the transmission disk 14 is able to rotate even when the cam ring 15 is stopped. In this state, the cover 6 can not be opened. Since the spring 25 is not so strong enough to move the swing lever 23 to its retracted position, the claw 23a keeps engaging the engaging hole 9a even after the rotation of the driven fork 18 is stopped. That is, once the drive fork (FIG. 2) rotates in the winding direction, it inhibits the cover 6 from opening.

When the drive fork 10 (FIG. 2) rotates in a rewinding direction (in a direction where the film is wound on the film spool 19a), the driven fork 18 and the transmission disk 14 are rotated counterclockwise (CCW) in FIG. 3A. Then, the cam ring 15 is rotated CCW due to a traction caused by the contact between the slide contact portion 15a and the transmission disk 14, so that the cam portion 15b moves away from the swing arm 23. Thus, the claw 23a is retracted from the engaging hole 9a by the force of the spring 25. The rotation of the cam ring 15 is stopped when the abutting member 15c abuts the second pin 22. In this state, the cover 6 can be opened. Since the engagement of the claw 23a and the engaging hole 9a does not happen until the drive fork 19a (FIG. 10) rotates in the winding direction, the cover 6 can be opened after the cam ring 15 is stopped. That is, once the drive fork 10 (FIG. 2) rotates in the rewinding direction, it allows the cover 6 to open.

With such an arrangement, once the film spool 19a (FIG. 2) is rotated in the winding direction, the cover 6 can not be opened until the film spool 19a is rotated in the rewinding direction. Further, once the film spool 19a is rotated in the rewinding direction, the cover 6 can be opened until the film spool 19a is rotated in the winding direction.

The arrangement of a latch mechanism is described. As shown in FIG. 1, the cover 6 is provided with an L-shaped cover hook 35 formed at the periphery thereof. When the cover 6 is closed, the hook 35 is inserted into a space between the back plate 7 and the chamber wall 9 through an insert opening 36 formed on the bottom wall 48 of the camera body 1. An L-shaped receive hook 27 is provided in the space between the back plate 7 and the chamber wall 9, which engages the cover hook 35 inserted into the space. In order to release the engagement of the cover hook 35 and the receive hook 27, an operation lever 29 is provided to the back plate 7 of the camera body 1. A opening 8 is provided to the back plate 7 of the camera body 1, through which the operation lever 29 is protruded.

Figure 4A:
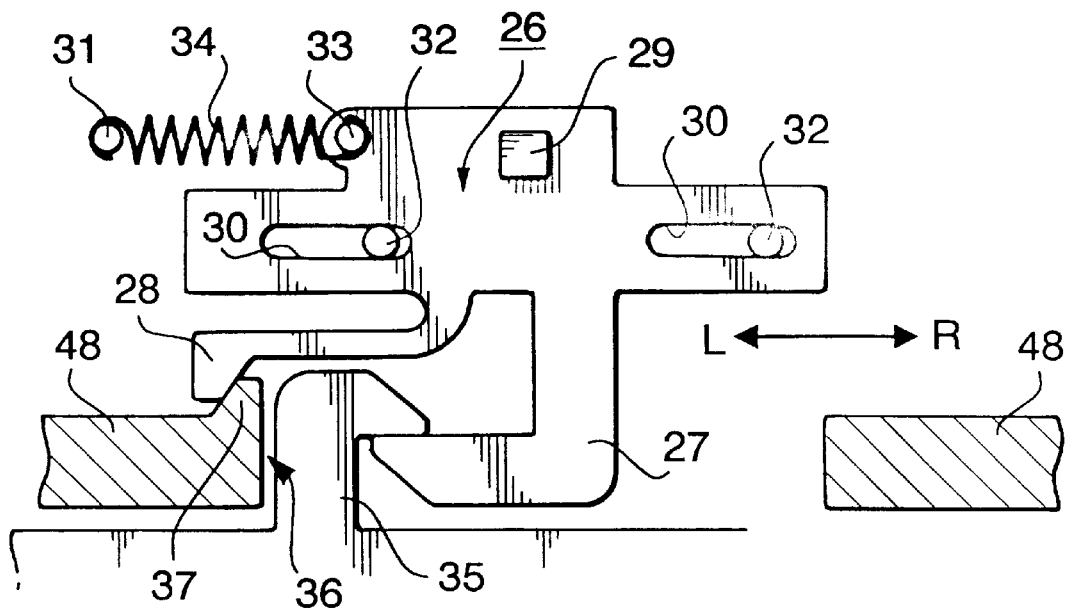
FIGS. 4A and 4B are schematic views of a latch mechanism respectively when the cover is latched and when the cover is not latched.
Figure 4B:
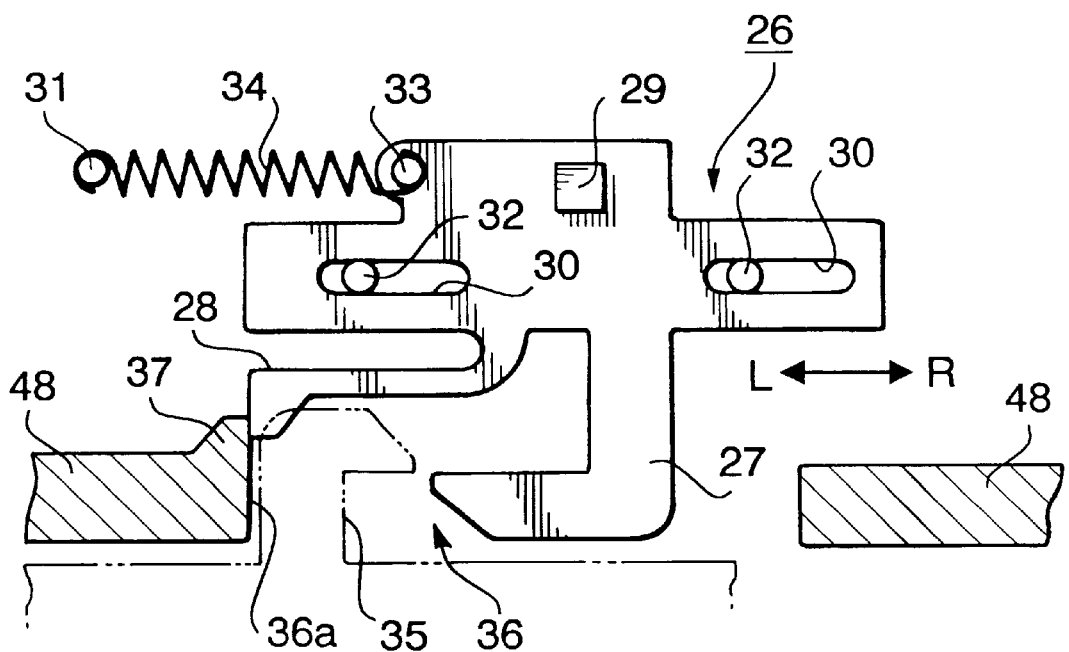

FIGS. 4A and 4B are schematic views of the latch mechanism. The latch mechanism includes a slider 26 slidably provided in the space between the back plate 7 and the chamber wall 9 (FIG. 2). The slider 26 is made of a plate member, on which the operation lever 29 is planted. The above described receive hook 27 extended downward from the slider 26. Two guide grooves 30 are formed on the slider 26 and two guide pins 32 are provided on the chamber wall 9 (FIG. 2). The slider 26 is guided laterally (in directions L and R in FIG. 4A) due to the engagement of the guide pins 32 and the guide grooves 30.

When the cover 6 (FIG. 1) is closed, the receive hook 27 engages the cover hook 35 as shown in FIG. 4A, so that the cover hook 35 does not drop out from the receive hook 27. The position of the slider 26 shown in FIG. 4A is referred to as an "original position" of the slider 26. A tension spring 34 is provided to urge the slider 26 in the direction L in FIG. 4A. One and of the tension spring 36 is fixed to a pin 31 planted on the chamber wall 9 (FIG. 2), while the other end of the tension spring 31 is fixed to a pin 33 planted on the slider 26.

The operation for opening and closing the cover 6 is described. The cover 6 can be opened unless the above-described claw 23a engages the engaging hole 9a of the cheer wall 9 as shown in FIG. 3B. On opening the cover 6, the user slides the operation lever 29 in the direction shown by 'open' in FIG. 1 while swinging the cover 6. Then, the slider 26 is moved in the direction R in FIG. 4B (resisting the force of the spring 34) so that the receive hook 27 releases the cover hook 35. In order to prevent the slider 26 from moving back to its original position, the slider 6 has a cantilever portion 28 which abuts a bank 37 formed (in the vicinity of the opening 36) on the bottom wall 48. When the user moves the operation lever 29 in the direction R, the cantilever portion 28 deforms and moves beyond the bank 37, which allows the slider 26 to slide in the direction R. Then, the cantilever portion 28 abuts an inner surface 36a of the opening 36 as shown in FIG. 4B. That is, the receive hook 27 does not moves back to its original position while the cover 6 is open.

On closing the cover 6, the cover hook 35 urges the cantilever portion 28 upward so that then cantilever portion 28 deforms. With this, the cantilever portion 28 moves beyond the bank 37 (due to the force of the spring 34), which allows the slider 26 to slide in the direction L. In this states, the cover hook 35 and the receive hook 27 engage with each other as shown in FIG. 4A.

As described above, according to the first embodiment, once the film spool 19a (FIG. 2) is rotated in the winding direction, the cover 6 can not be opened (even when the user operates the operation lever 29), until the film spool 19a is rotated in the rewinding direction. In other word, the cover can not be opened until the film is used up (and a film rewinding is performed). This state is referred to as a first mode. Thus, it is prevented that the unused film is unintentionally exposed. Further, once the film spool 19a (FIG. 2) is rotated in the rewinding direction, the cover 6 can be opened. That is, the cover 6 can be opened after the film is used up and wound in the film patrone. This state is referred to as a second mode. Since the first and second modes are automatically switched due to the rotation of the film spool 19a, the operation of the camera body 1 becomes easy.

The second embodiment is described with reference to FIGS. 5 through 8B.

Figure 5:
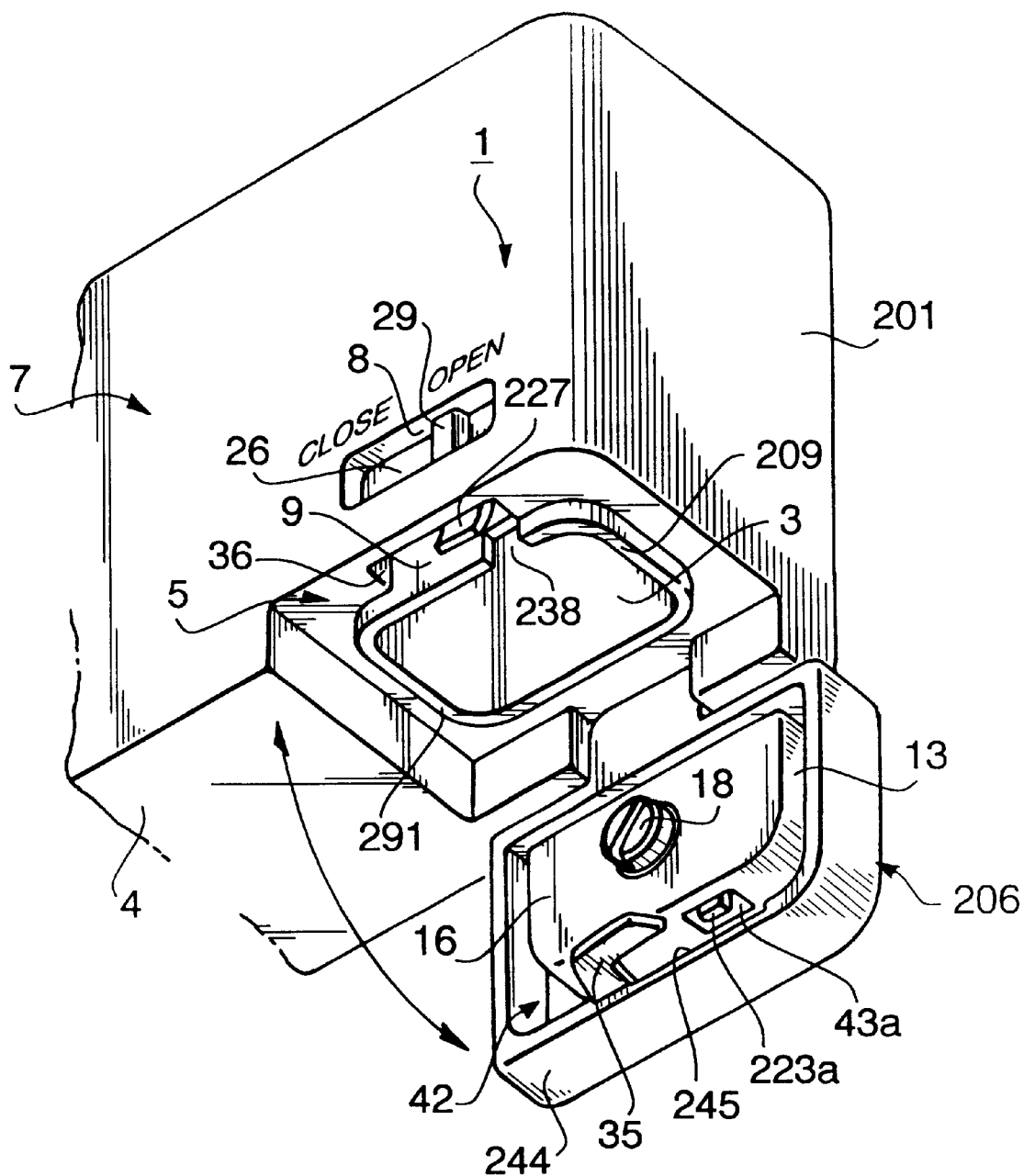
FIG. 5 is a bottom perspective view of a camera of the second embodiment.
Figure 6:
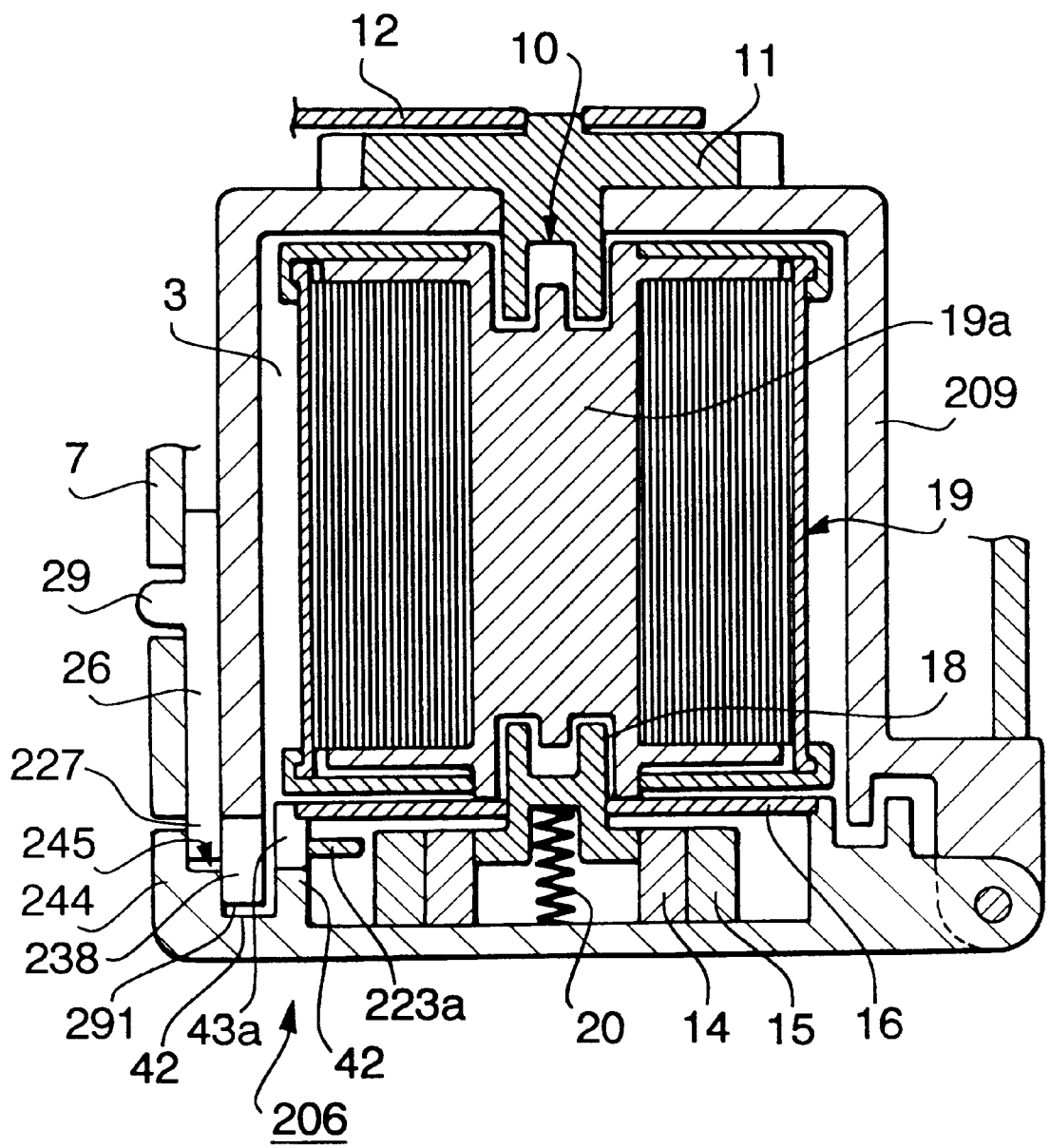
FIG. 6 is a sectional view of a film chamber and a cover of the camera of FIG. 5.

FIG. 5 is a bottom perspective view of a camera 201 of the second embodiment. FIG. 6 is a sectional view of a film chamber and a cover of the second embodiment. As shown in FIGS. 5 and 6, a chamber wall 209 of the second embodiment has a notch 238 instead of the engaging hole 9a of the first embodiment (FIG. 1). The notch 238 opens at a bottom 291 of the chamber wall 209. Other arrangement of the chamber wall 209 (except the notch 238) is same as the chamber wall 9 of the first embodiment. As shown in FIG. 6, an outer wall 244 of a cover 206 of the second embodiment has a step portion 245 which is lower than the other portion of the outer wall 244. The step portion 245 forms a space in which the lower portion of a receive hook 227 (described below) moves.

Figure 7A:
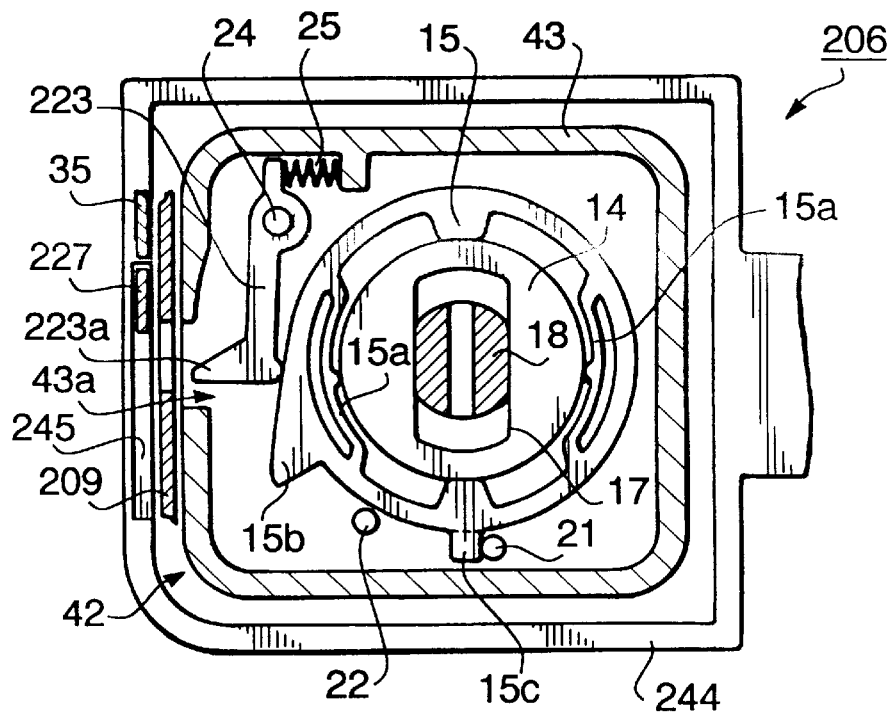
FIGS. 7A and 7B are plan views of a cover of the second embodiment respectively when cover is unlocked and the cover is locked.
Figure 7B:
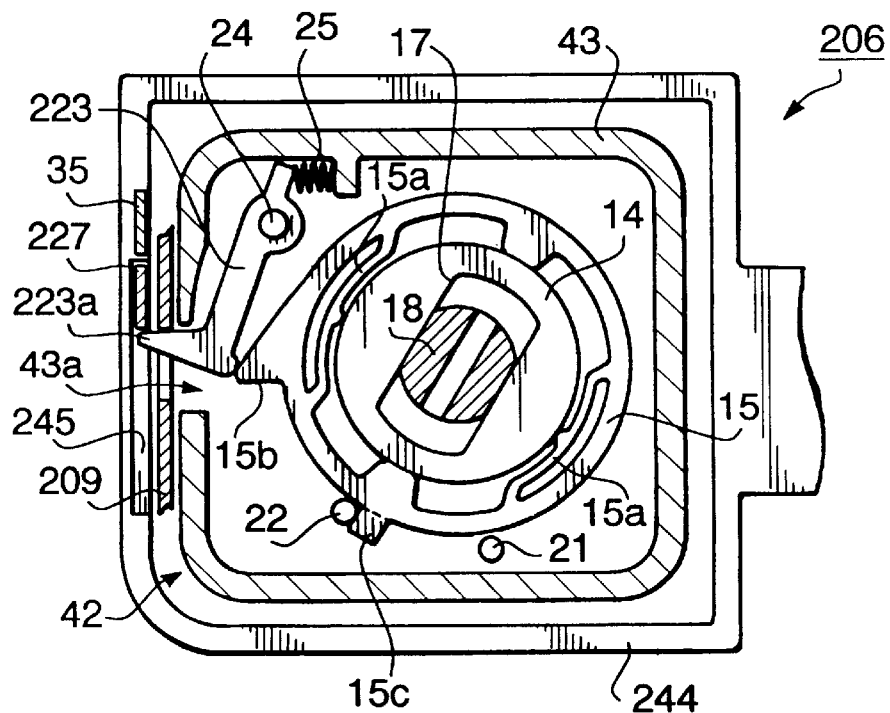
Figure 8A:
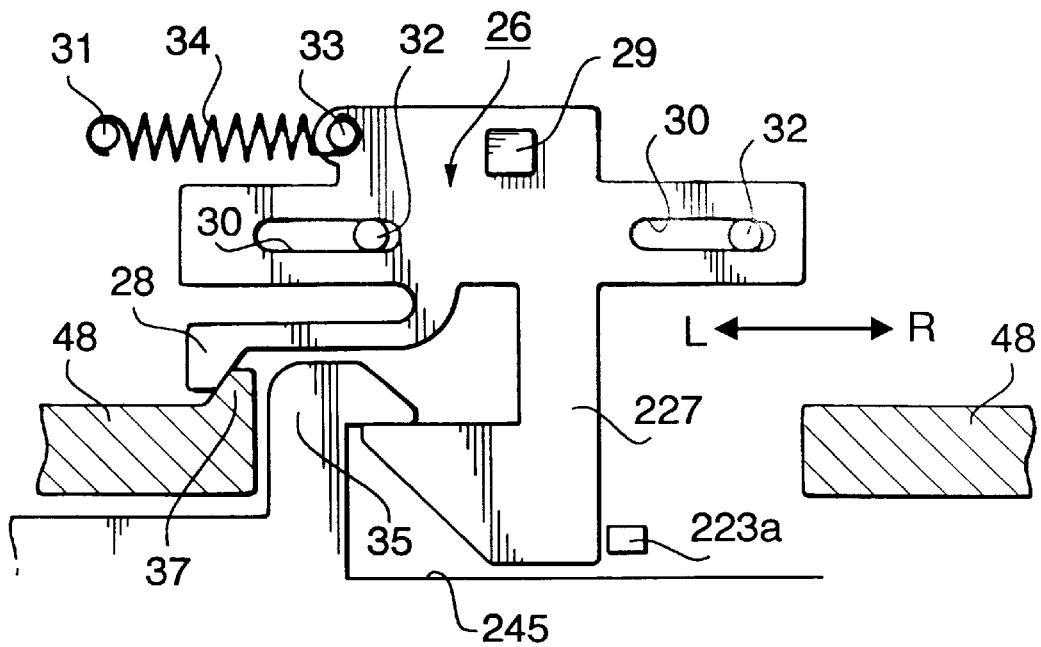
FIGS. 8A and 8B are schematic views of a latch mechanism respectively when the cover is latched and when the cover is not latched.
Figure 8B:
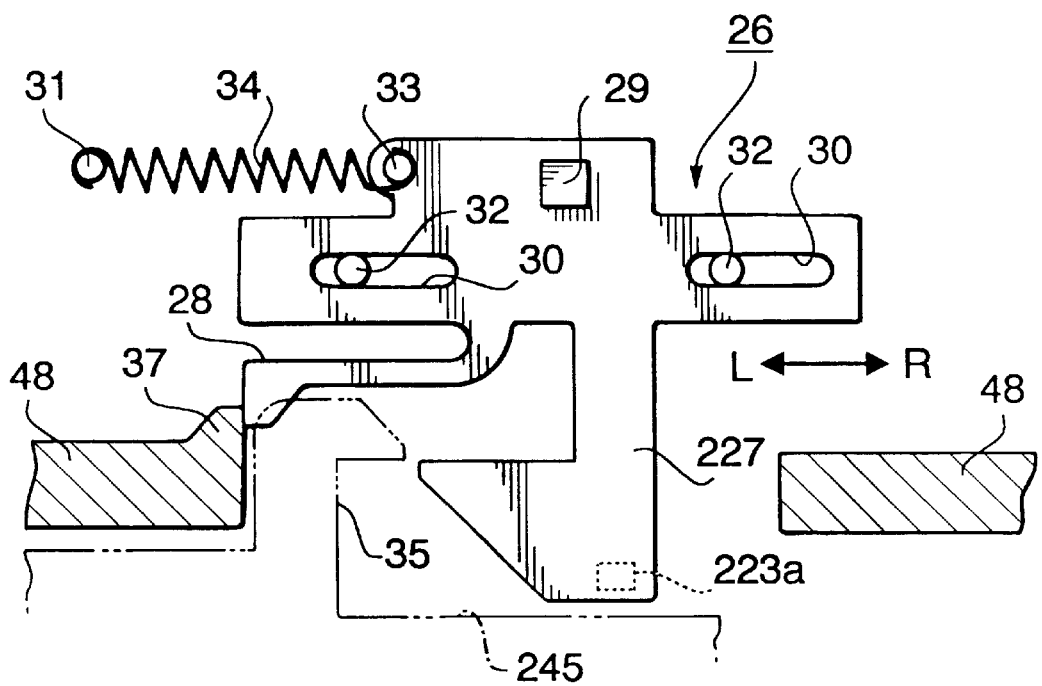

FIGS. 7A and 7B show the cover 206 of the second embodiment. The swinging amount of a swing lever 223 of the second embodiment is larger than the swing lever 23 of the first embodiment. The amount of the swing lever 223 is so set that a claw 223a of the swing lever 223 reaches the outer wall 244. Other arrangement of the cover 206 is same as that of the cover 6 of the first embodiment. FIGS. 8A and 8B show the latch mechanism of the second embodiment. As shown in FIGS. 8A and 8B, the latch mechanism is the same as that of the first embodiment except a receive hook 227. The receive hook 227 of the second embodiment is larger than the receive hook 27 of the first embodiment so that the lower portion of the receive hook 227 is located at the same height as the claw 223a.

As shown in FIG. 7B, when the drive fork 10 (FIG. 6) rotates in the winding direction (that is, when the driven fork 18 rotates CW), the claw 223a moves into the moving path of the receive hook 227. Then, the claw 23a restricts the receive hook 227 so that the receive hook 227 does not release the cover hook 35 as shown in FIG. 8A. It makes the operation lever 29 non-operable. As shown in FIG. 7A, when the drive fork 10 (FIG. 6) rotates in the rewinding direction (that is, when the driven fork 18 rotates CCW), the claw 231 is retracted from the moving path of the receive hook 227. Thus, the receive hook 227 is allowed to move. It makes the operation lever 29 operable.

With such an arrangement, according to the second embodiment, the operation lever 29 is not operable when the film spool 19a (FIG. 6) rotates in a winding direction, while the operation lever 29 is operable when the film spool 19a (FIG. 6) rotates in the rewinding direction. Thus, like the first embodiment, it is prevented that the unused film is unintentionally exposed.

The third and fourth embodiments are described with reference to FIGS. 9 to 12. In the above described first and second embodiments, if the user touches the driven fork 18 while the cover is opened, the claw 23a (223a) is unintentionally projected. It may interfere the closing operation of the cover 6. The third and fourth embodiments are intended to prevent this problem.

Figure 9:
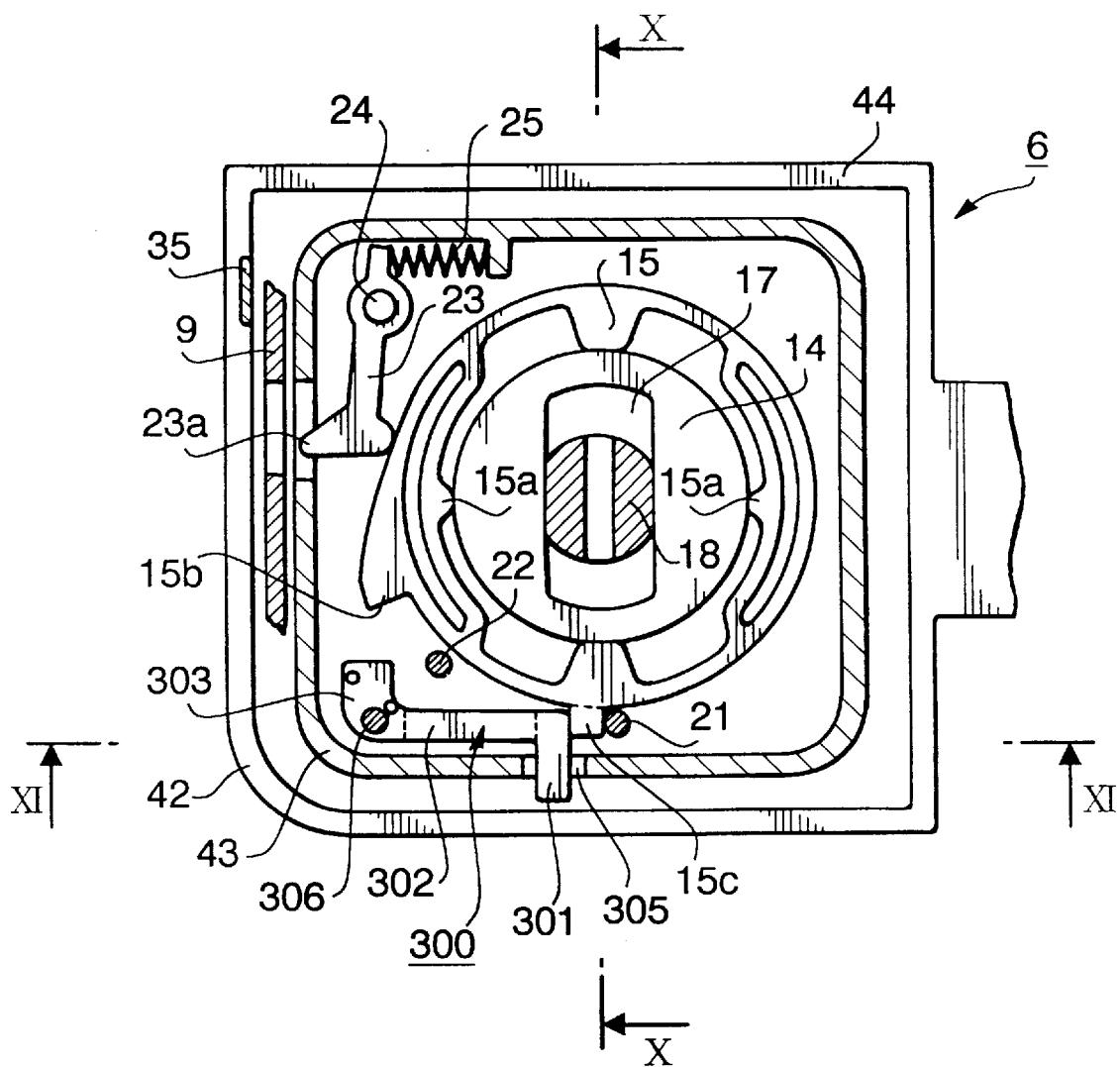
FIG. 9 is a plan view of a cover with a stopper mechanism of the third embodiment.
Figure 10A:
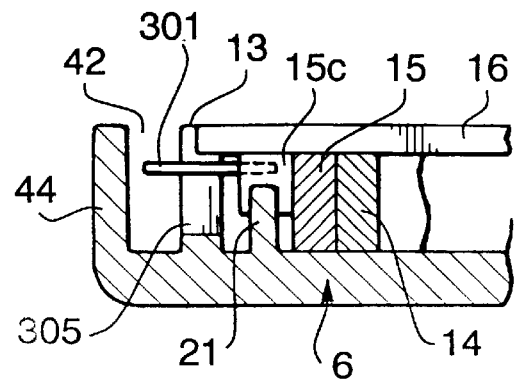
FIGS. 10A and 10B are sectional views of the stopper mechanism of the third embodiment respectively when the stopper mechanism works and when the stopper mechanism does not work.
Figure 10B:
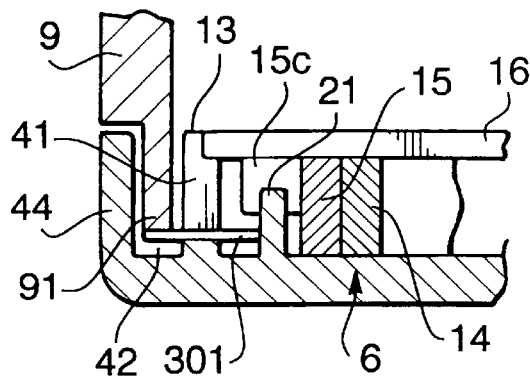
Figure 11A:
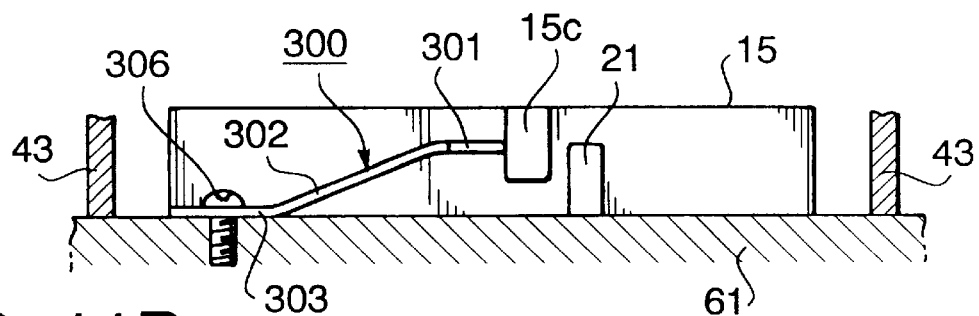
FIGS. 11A and 11B are sectional views of the stopper mechanism respectively when the stopper mechanism works and when the stopper mechanism does not work.
Figure 11B:
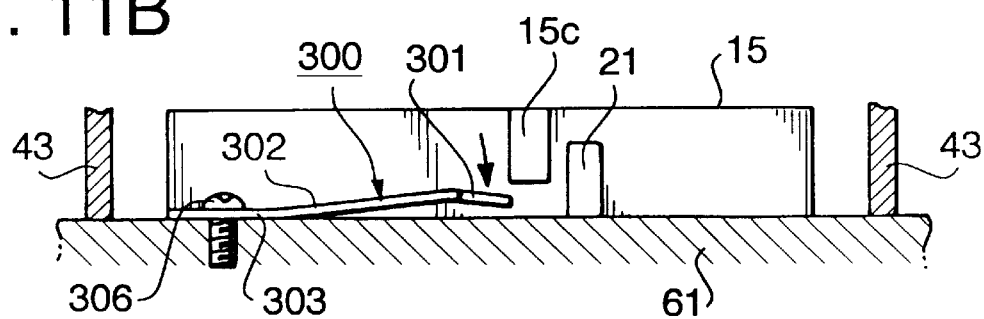

As shown in FIG. 9, in the third embodiment, a stopper plate 300 is provided to the cover 6 of the first embodiment. The stopper plate 300 is arranged to stop the rotation of the cam ring 15 when the cover 6 is opened. FIGS. 10A and 10B are sectional views of the cover 6, taken along the line X—X of FIG. 9. FIGS. 11A and 11B are sectional views of the cover 6, taken along the line XI—XI of FIG. 9. As shown in FIG. 11A, the stopper plate 300 is made of a metal band which is bent into three portions: a top flat portion 301, an intermediate inclined portion 302 and a bottom flat portion 303. The bottom flat portion 303 is fixed to a base plate 61 of the cover 6 (via a fixing screw 306) and the top flat portion 301 abuts the abutting portion 15c of the cam ring 15. In this state, the cam ring 15 is not rotatable. As shown in FIG. 10A, the top plat portion 301 further extends through an opening 305 formed on the inner wall 43, so that the tip of the top flat portion 301 exist in the groove 42. When the cover 6 is closed, the top flat portion 301 is urged downward by the bottom end 91 of the chamber wall 9 as shown in FIG. 10B. Thus, the abutting portion 15c of the cam ring 15 is released from the top flat portion 301 of the stopper lever 300 as shown in FIG. 11B. In this state, the cam ring 15 is rotatable.

According to the third embodiment, if the driven fork 18 is unintentionally touched when the cover 6 is opened, it is prevented that the cam ring 15 is unintentionally rotated. That is, it is prevented that the claw 23a is unintentionally projected while the cover 6 is opened.

Figure 12:
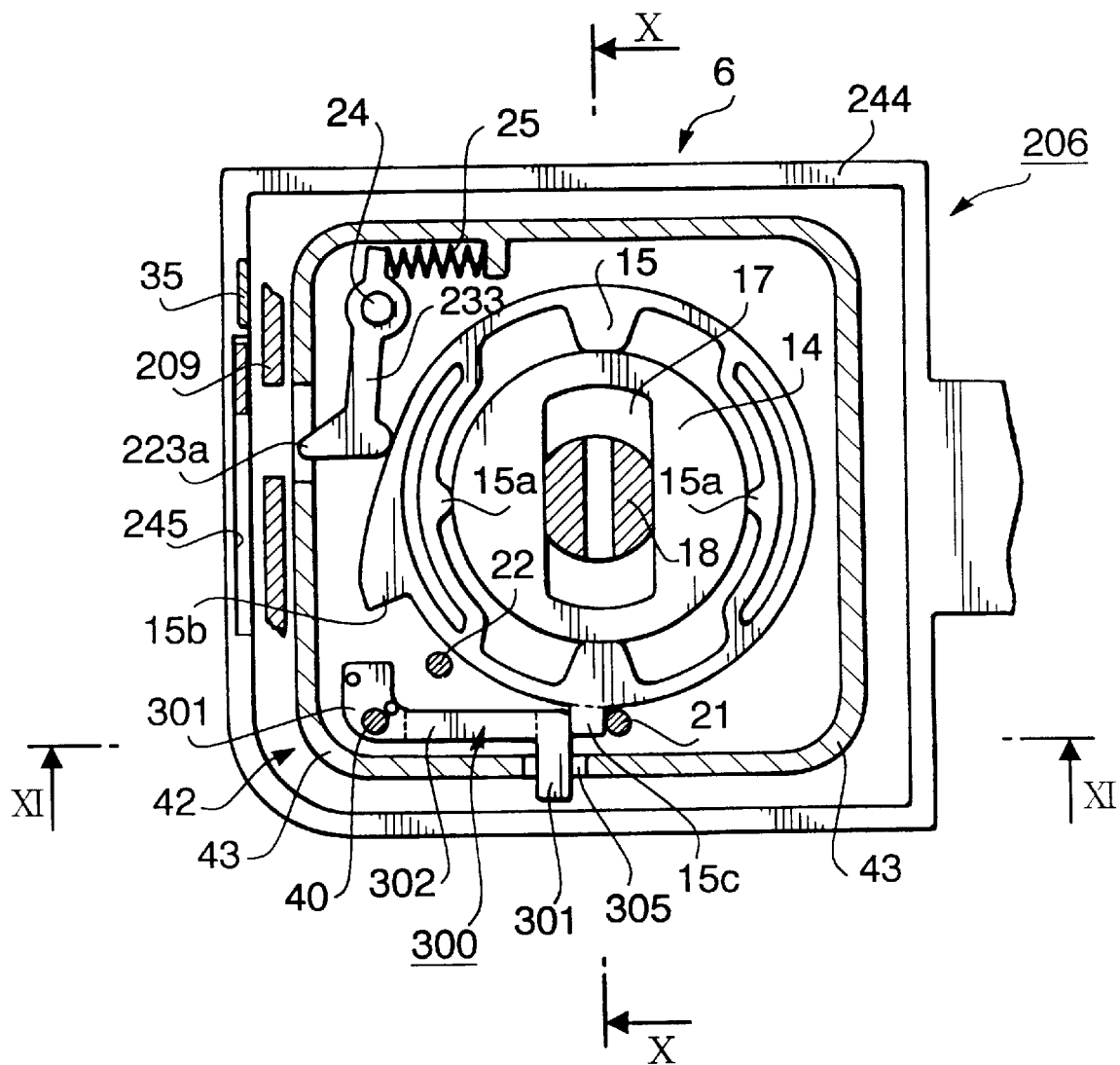
FIG. 12 is a plan view of a cover with a stopper mechanism of the fourth embodiment.

As shown in FIG. 12, in the fourth embodiment, the stopper plate 300 is provided to the cover 206 of the second embodiment. Like the third embodiment, in the fourth embodiment, if the driven fork 18 is unintentionally touched when the cover 206 is opened, it is prevented that the cam ring 15 is unintentionally rotated. That is, it is prevented that the claw 23a is unintentionally projected while the cover 206 is opened.

Although the structure and operation of a camera is described herein with respect to the preferred embodiments, many modifications and changes can be made without departing from the spirit and scope of the invention.

The present disclosure relates to subject matter contained in Japanese Patent Application No. HEI 09-25022 filed on Feb. 7, 1997, which is expressly incorporated herein by reference in its entirety.

What is claimed is:

1. A camera with a cover mechanism of a film chamber, said camera comprising:
    a camera body;
    a spool holder which rotatably supports a film spool accommodated in said film chamber, said film spool being rotatable in a winding direction and a rewinding direction;
    a cover provided to said camera body, said cover opening and closing said film chamber; and
    a lock mechanism that is operable in first and second modes, said lock mechanism being arranged to inhibit said cover from opening in said first mode and to allow said cover to open in said second mode,
    wherein said first mode starts when said film spool is rotated in said winding direction and continues until said film spool is rotated in said rewinding direction, and
    wherein said second mode starts when said film spool is rotated in said rewinding direction and continues until said film spool is rotated in said winding direction.

2. The camera according to claim 1, said spool holder comprising a drive fork and a driven fork supporting said film spool therebetween,
    wherein said lock mechanism is actuated in response to the rotation of said driven fork.

3. The cover mechanism according to claim 1, further comprising:
    a latch mechanism which latches said cover;
    an operation member that is operated to release said latch mechanism thereby to open said cover;
    wherein said lock mechanism locks said cover even when said operation member is operated to release said latch mechanism thereby to open said cover.

4. The camera according to claim 3, said lock mechanism comprising an engaging member movably provided to said cover,
    wherein said engaging member engages a chamber wall of said film chamber when said lock mechanism is in said first mode.

5. The camera according to claim 4, said lock mechanism further comprising:
    a cam ring which moves said engaging member;
    a transmission disk which transmits the rotation of said spool to said cam ring; and
    restriction members which restrict the rotating angle of said cam ring,
    wherein, when said lock mechanism is in said first mode, said cam ring reaches one end of said rotating angle, and
    wherein, when said lock mechanism is in said second mode, said cam ring reaches another end of said rotating angle.

6. The camera according to claim 5, wherein said cam ring, said transmission disk and said restriction member are provided to said cover.

7. The camera according to claim 5, wherein, when said cam ring is stopped while said film spool is rotated, said cam ring and said transmission disk slide with respect to each other to allow the rotation of said spool.

8. The camera according to claim 7, further comprising a drive fork and a driven fork supporting said film spool therebetween,
    wherein said transmission disk is fixed to said driven fork.

9. The camera according to claim 7, wherein said cam ring has a slidable contact portion which slidably contacts the peripheral surface said transmission disk.

10. The camera according to claim 5, further comprising an arrangement that maintains said lock mechanism in said second mode, when said cover is opened.

11. The camera according to claim 10, said arrangement including a stopper provided to said cover,
    wherein, when said cover is closed, said stopper is urged by said wall of said film chamber so that said stopper is retracted from a position in which said stopper stops said cam ring.

12. The cover mechanism according to claim 1, further comprising:
    a latch mechanism which latches said cover;
    an operation member that is operated to release said latch mechanism thereby to open said cover;
    wherein said lock mechanism disables said operation member when said lock mechanism is in said first mode.

13. The camera according to claim 12, said lock mechanism comprising an engaging member movably provided to said cover,
    wherein, when said lock mechanism is in said first mode, said engaging member interferes said operation member so as to disable said operation member.

14. The camera according to claim 13, said lock mechanism further comprising:
    a cam ring which moves said engaging member;
    a transmission disk which transmits the rotation of said spool to said cam ring; and
    restriction members which restrict the rotating angle of said cam ring,
    wherein, when said lock mechanism is in said first mode, said cam ring reaches one and of said rotating angle, and
    wherein, when said lock mechanism is in said second mode, said cam ring reaches another end of said rotating angle.

15. The camera according to claim 14, wherein, when said cam ring is stopped and said film spool is rotated, said cam ring and said transmission disk slide with respect to each other.

16. The camera according to claim 14, further comprising a drive fork and a driven fork provided to said film chamber, said drive and driven forks supporting said film spool therebetween, wherein said transmission disk engages said driven fork.

17. The camera according to claim 14, further comprising an arrangement that maintains said lock mechanism in said second mode, when said cover is opened.

18. The camera according to claim 17, said arrangement including a stopper provided to said cover, wherein, when said cover is closed, said stopper is urged by a chamber wall of said film chamber so that said stopper is retracted from a position in which said stopper stops said cam ring.

19. A camera with a cover mechanism of a film chamber, said camera comprising:

a camera body;

a spool holder which rotatably supports a film spool accommodated in said film chamber, said film spool being rotatable in a winding direction and a rewinding direction;

a cover provided to said camera body, said cover opening and closing said film chamber;

a lock mechanism that is operable in first and second modes, said lock mechanism being arranged to inhibit said cover from opening in said first mode and to allow said cover to open in said second mode; and an arrangement that maintains said lock mechanism in said second mode when said cover is opened, wherein said first mode starts when said film spool is rotated in said winding direction and continues until said film spool is rotated in said rewinding direction, wherein said second mode starts when said film spool is rotated in said rewinding direction and continues until said film spool is rotated in said winding direction.

20. A cover mechanism of a film chamber of a camera, said film chamber accommodating a film spool, said film spool being rotatable in winding and rewinding directions, said cover mechanism comprising:

a cover provided to a body of said camera, said cover opening and closing a film chamber;

a lock mechanism that is operable in first and second modes, said lock mechanism being arranged to lock said cover in said first and to unlock said cover in said second mode, wherein said first mode starts when said film spool is rotated in said winding direction and continues until said film spool is rotated in said rewinding direction, and wherein said second mode starts when said film spool is rotated in said rewinding direction and continues until said film spool is rotated in said winding direction.

21. The cover mechanism according to claim 20, further comprising a latch mechanism which latches said cover; and an operation member that is operated to release said latch mechanism thereby to open said cover.

22. The cover mechanism according to claim 20, said lock mechanism comprising an engaging member provided to said cover, wherein said engaging member engages a chamber wall of said film chamber when said lock mechanism is in said first mode.

23. The cover mechanism according to claim 20, said lock mechanism comprising an engaging member movably provided to said cover, wherein, when said lock mechanism is in said first mode, said engaging member interferes said operation member so as to disable said operation member.

* * * * *